United States Patent [19]
Guest

[11] Patent Number: 5,738,387
[45] Date of Patent: Apr. 14, 1998

[54] TUBE COUPLINGS

[76] Inventor: John Derek Guest, 'Iona', Cannon Hill Way, Bray, Maidenhead, Berkshire SL6 2EX, United Kingdom

[21] Appl. No.: 717,488

[22] Filed: Sep. 20, 1996

[30] Foreign Application Priority Data

Sep. 20, 1995 [GB] United Kingdom ............... 9519199

[51] Int. Cl.$^6$ .................................. F16L 35/00; F16L 21/06
[52] U.S. Cl. ...................................... 285/322; 285/323
[58] Field of Search ..................................... 285/322, 323, 285/243, 307, 308

[56] References Cited

U.S. PATENT DOCUMENTS

| | | | |
|---|---|---|---|
| 3,895,832 | 7/1975 | Ellis et al. | 285/322 |
| 3,909,046 | 9/1975 | Courtot et al. | 285/323 |
| 4,637,636 | 1/1987 | Guest | 285/323 |
| 4,666,190 | 5/1987 | Yamabe et al. | 285/322 |
| 5,042,848 | 8/1991 | Shiozaki | 285/323 |
| 5,284,369 | 2/1994 | Kitamura | 285/322 |

FOREIGN PATENT DOCUMENTS

| | | |
|---|---|---|
| 0 163 992 | 12/1985 | European Pat. Off. . |
| 0 331 116 | 9/1989 | European Pat. Off. . |
| 2 232 731 | 6/1973 | France . |

*Primary Examiner*—Eric K. Nicholson
*Attorney, Agent, or Firm*—Baker & Daniels

[57] ABSTRACT

A tube coupling comprising a coupling body having a throughway open at one end to receive a tube extending into the throughway. A collet is located in the open end of the throughway for holding the tube in the throughway comprising an annular head located outside the throughway and having a plurality of arms extending into the throughway and terminating in enlarged heads. The inner side of the throughway and the outer side of the tube have parallel tapered cam surfaces which reduce towards the open end of the throughway and the collet heads have inner and outer faces which are parallel to one another and to the tapered cam surfaces and engage therewith such that the heads are subjected solely to compression in resisting withdrawal of the tube from the throughway.

14 Claims, 1 Drawing Sheet

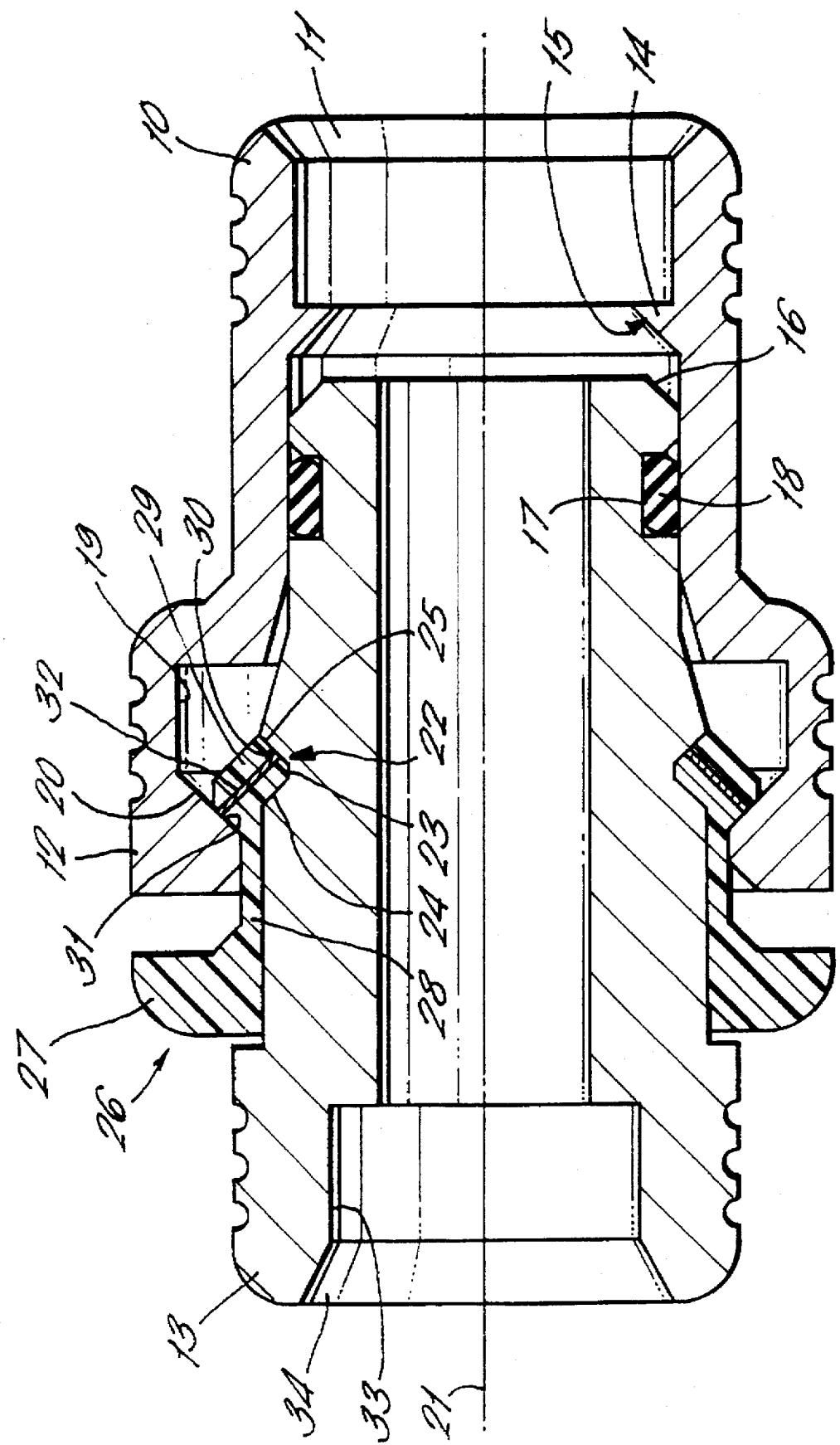

TUBE COUPLINGS

BACKGROUND OF THE INVENTION

1. FIELD OF THE INVENTION

This invention relates to tube couplings.

2. BACKGROUND PRIOR ART

Known forms of tube couplings include a coupling type in which a body has a throughway open at one end to receive a tube with a collet extending into the open end of the throughway through which a tube can be inserted. The collet has fingers terminating in heads in the throughway and the throughway having a tapered cam surface reducing towards the open end of the throughway with which the heads of the collet are engageable to grip and hold the tube in the throughway. Tube couplings of this type are described and illustrated in, for example, my U.K Patent Nos. 1520742 and 1573757.

It will be appreciated that in such couplings pressure within the medium in the tube coupling tends to force the tube out of the coupling. Such movement is resisted by the collet and the greater the force tending to drive the tube out of the coupling so the greater the force generated by the cam surface on the heads of the collet holding the tube to resist movement of the tube from the coupling. With exceptionally high pressures, the stresses imposed on the heads of the collet are correspondingly high and it is an object of the present invention to provide an arrangement which minimises the risk of failure of the coupling either by rupture or distortion of the heads of the collet or in the gripping action on the tube.

SUMMARY OF THE INVENTION

This invention provides a tube coupling comprising a coupling body having a throughway open at one end to receive a tube extending into the throughway, a collet located in the open end of the throughway for holding the tube in the throughway comprising an annular head located outside the throughway having a plurality of arms extending into the throughway and terminating in enlarged heads in an end part of the throughway, the inner side of the throughway and the outer side of the tube having parallel tapered cam surfaces which reduce towards the open end of the throughway and the collet heads having inner and outer faces which are parallel to one and other and to said tapered cam surfaces with which they engage such that the heads are subjected solely to compression in resisting withdrawal of the tube from the throughway.

In a preferred arrangement according to the invention the heads on the collet fingers are of rectangular cross-section in a plane containing the axis of the throughway with the elongate direction of the rectangle extending at an angle to the axis and the ends of the rectangle providing said inner and outer surfaces of the head in engagement with the tapered cam surfaces on the throughway and tube respectively.

It is also preferred that the collet is formed in a resilient plastics.

In the latter case the heads of the collet may have metal plates embodied therein extending between said parallel faces at the inner and outer sides of the heads at right angles to said faces.

In any of the above arrangements the arms and heads of the collet may be of arcuate form to extend around the tube and throughway.

Also in any of the above arrangements the tapered cam surfaces on the throughway and tube may extend at 45° to the central axis of the throughway as viewed in cross-section and the inner and outer parallel surfaces on the heads which engage the tapered cam surfaces also extend at 45° to the central axis.

The tapered cam surface on the tube may be formed by one side of an annular groove encircling the tube in which the inner corners of the heads of the collet engage.

According to a further feature the tube may comprise a hollow male stem extending into the coupling body through the collet and having a head at its end disposed outside the coupling body formed with a socket to which an end of a tube is securable.

BRIEF DESCRIPTION OF THE DRAWING

The following is a description of a specific embodiment of the invention, reference being made to the accompanying drawing which is a sectional view through a tube coupling intended to be capable of resisting exceptionally high pressures.

DESCRIPTION OF THE PREFERRED EMBODIMENT

Referring to the drawing, there is shown a tube coupling comprising a coupling body 10 having a throughway 11 and having an enlarged open ended socket 12 at one end.

A tube in the form of a male stem 13 is inserted in the throughway 11 through the socket 12. The throughway 11 has an encircling integral end stop 14 formed with a chamfered face 15 directed towards the socket end of the throughway and the stem 13 has a chamfered end 16 engageable with the tube stop when the stem is fully inserted into the throughway. The stem has an encircling annular groove 17 containing an O-ring seal 18 which engages the inner surface of the throughway to seal the stem to the throughway against loss of fluid from within the stem/throughway.

The socket 12 at the end of the coupling body 10 provides an enlarged cavity 19 to receive part of a collet for locking the stem in the coupling body to be described below. Towards the mouth of the socket, the inner wall of the socket is formed with an annular tapering cam surface 20 reducing in diameter towards the mouth of the socket. As viewed in cross-section, the angle between the plane containing the cam surface and the axis 21 of the throughway is 45°.

The stem 13 has an annular encircling groove 22 located within the socket. The groove, in cross-section, comprising a narrow flat base 23 with inclined side walls 24, 25 also lying at 45° to the axis of the throughway. Thus one of the side walls, 25, forms a further tapered cam surface lying parallel to and spaced from the tapered cam surface. The adjacent side wall 24 lies at right angles to the side wall 25.

A plastics collet indicated generally at 26 encircles the stem 13 and extends into the socket 12 of the coupling body. The collet comprises an annular head 27 disposed outside the socket in the coupling body and having a plurality of arcuate cross-section resilient arms 28 projecting along the stem through the open end of the coupling body into the socket 19. Each finger has an enlarged arcuate head 29 with its free end within the socket cavity which, in cross-section, is of generally elongate regular form extending again at 45° to the axis 21 of the throughway. The end faces of each head provide parallel inner and outer faces 30, 31 which also extend at 45° degrees to the axis 21 and engage the faces 25 and 20 respectively on the stem and socket wall. Each head is reinforced by stainless steel insert bar 32 extending longitudinally through the head between the end faces 30, 31 and at right angles to those faces.

Pressure within the tube stem/throughway of the coupling body will tend to push the stem 13 outwardly of the body. That movement is resisted by the heads 29 of the collet in pure compression between the faces 25 and 20 of the stem and socket respectively without a shear force being imposed on the heads.

Since the heads resist extraction of the stem purely in compression it can withstand exceptionally high pressures in the stem/throughway. The stainless steel reinforcement members in the heads further enhance their abilities to withstand the compression loads. Moreover the engagement of the heads 29 with the faces 25 of the groove 22 firmly resist slippage of the stem within the collet.

The insert can be readily released from the coupling body when required by pressing the insert and collet into the coupling body to provide clearance between the heads 29 and annular cam face 20 in the socket. The stem can then be extracted from the collet deflecting the heads 29 out of the grooves 22 and thence through the collet and out of the coupling body.

The stem 13 at its end disposed outside the coupling body is formed with a counter bore 33 with a chamfered entry 34 to receive a tube which is welded or otherwise joined to the stem. Alternatively, the end part of a tube to be secured in a coupling body is formed with the annular groove and the seal arrangement as described.

It would be appreciated that the coupling body described above gives a very high tube retention strength and burst pressure resistance. The greater performance is due to the collet head being subjected to pure compression forces. That is the collet head is sandwiched between a 45° angled body and 45° angled groove in the male stem or tube. The collet tooth itself also has 45 angles to accommodate.

The tube coupling is suitable for a wide range of applications including both hydraulic and air lines. Moreover the coupling can be used with a soft wall tubing which the collet heads will dig into to create the groove in the tube with its tapered cam surface which acts on the heads.

I claim:

1. A tube coupling comprising a coupling body having a throughway open at one end for receiving a tube extending into the throughway, a collet located in the open end of the throughway for holding a said tube in the throughway and comprising an annular head located outside the throughway, said collet having a plurality of arms extending into the throughway and terminating in enlarged heads located in an end part of the throughway, the inner side of the throughway having a tapered cam surface which reduces towards the open end of the throughway, the heads having inner and outer faces which are parallel to one another and to said tapered cam surface for engaging with both said tapered cam surface and a parallel tapered cam surface on a said tube such that the heads are subjected solely to compression in resisting withdrawal of a said tube from the throughway.

2. A tube coupling as claimed in claim 1, wherein the heads are of rectangular cross-section in a plane containing the axis of the throughway with the elongate direction of the rectangle extending at an angle to the axis, the ends of the rectangle providing said inner and outer surfaces.

3. A tube coupling as claimed in claim 1, wherein the collet is formed of a resilient plastic material.

4. A tube coupling as claimed in claim 3, wherein the heads have metal plates embodied therein extending between said inner and outer faces and at right angles to said inner and outer faces.

5. A tube coupling as claimed in claim 1, wherein the arms and heads are of arcuate form to extend around the throughway and a said tube.

6. A tube coupling body as claimed in claim 1, wherein the tapered cam surface extends at 45° to the central axis of the throughway as viewed in cross-section and the inner and outer faces also extend at 45° to said central axis.

7. A tube coupling as claimed in claim 1, further comprising a tube which comprises a hollow male stem extending into the coupling body through the collet, said tube having a tapered cam surface extending parallel to and engaging said tapered cam surface and said inner and outer faces and having a head at its end disposed outside the coupling body, said tube formed with a socket to which an end of a further tube is securable.

8. A tube coupling as claimed in claim 7, wherein the tapered cam surface of said tube is formed by one side of an annular groove encircling the tube, said heads including inner corners for engaging said annular groove.

9. A tube coupling as claimed in claim 7, wherein the tapered cam surface of said tube is preformed in the tube.

10. A tube coupling as claimed in claim 7, wherein the tube is a soft walled tube and the tapered cam surface of said tube is formed by engagement of the heads in the surface of said tube.

11. A tube coupling body as claimed in claim 2, wherein the tapered cam surface extend at 45° to the central axis of the throughway as viewed in cross-section and the inner and outer faces also extend at 45° to said central axis.

12. A tube coupling body as claimed in claim 3, wherein the tapered cam surface extend at 45° to the central axis of the throughway as viewed in cross-section and the inner and outer faces also extend at 45° to said central axis.

13. A tube coupling body as claimed in claim 4, wherein the tapered cam surface extend at 45° to the central axis of the throughway as viewed in cross-section and the inner and outer faces also extend at 45° to said central axis.

14. A tube coupling body as claimed in claim 5, wherein the tapered cam surface extend at 45° to the central axis of the throughway as viewed in cross-section and the inner and outer faces also extend at 45° to said central axis.

* * * * *